3,153,007
PROCESS FOR MAKING ORGANOPOLYSILOX-
ANES USING BROMOALKANE DECATALYZ-
ING AGENTS FOR EXCESS ALKALI-METAL
CATALYSTS
Reginald J. Boot, Schenectady, N.Y., assignor to General
Electric Company, a corporation of New York
No Drawing. Filed Dec. 12, 1960, Ser. No. 75,131
4 Claims. (Cl. 260—46.5)

The present invention relates to an improved process for making moisture stable organopolysiloxanes convertible to the cured, solid, elastic state including fluid organopolysiloxanes containing terminal silicon-bonded hydroxy radicals. More particularly, the present invention relates to the employment of certain bromoalkanes as decatalyzing agents for excess alkali-metal catalyst present in organopolysiloxane polymers that are produced by the base catalyzed equilibration of low molecular weight cyclic polysiloxanes.

One of the preferred methods for producing organopolysiloxane gums convertible to the cured, solid, elastic state is to catalyze the interpolymerization of low molecular weight polydiorganosiloxy units, by heating low molecular diorganocyclopolysiloxanes in the presence of a basic catalyst. Hyde for example, shows in Patent 2,490,-357 that low molecular weight cyclic polysiloxanes preferably of less than 12 silicon atoms per molecule can be rearranged to produce high molecular weight organopolysiloxane gums by heating the low molecular weight cyclics in the presence of a base such as potassium hydroxide. Although the rearrangement and intercondensation of the diorganopolysiloxy units that are produced from cyclic polysiloxanes are principally intercondensed to the high polymeric state, a proportion of such diorganopolysiloxy units revert back to the low molecular weight cyclic state during the equilibration period, resulting in the production of organopolysiloxane gums convertible to the cured, solid, elastic state that contain an undesirable amount of low molecular weight cyclics. "Devolatilizing" the resulting organopolysiloxane gum can be accomplished by such methods as vacuum stripping, or steam distillation. During the course of the devolatilization of the organopolysiloxane gum, experience has shown that due to the presence of the alkali-metal catalyst in the gum, the polymerization reaction can be reversed resulting in the formation of further amounts of low molecular weight cyclics and excessive weight loss of polymer. In addition, the devolatilized or stripped organopolysiloxane polymer produced thereby is susceptible to what is generally referred to as "reversion." As a result, such organopolysiloxane polymers convertible to the cured, solid, elastic state, or the reinforced elastomers derived therefrom can suffer drastic changes in physical properties when exposed to moisture at elevated temperatures due to base catalyzed reversion of the polymer.

In addition to organopolysiloxane polymers in the form of a gum, the presence of alkali-metal catalyst can also detrimentally affect organopolysiloxane polymers in the form of a linear, fluid hydroxy chain-stopped organopolysiloxane that are employed in organopolysiloxane compositions convertible to the cured, solid, elastic state at room temperature, as taught by Berridge, Patent 2,843,555.

One solution to the adverse effect of the alkali metal catalysts is to remove the catalyst from the organopolysiloxane after polymerization by washing. The washing of organopolysiloxanes can be effected by neutralizing the alkali metal catalyst with a compound such as acetic acid and extracting the sodium acetate that is formed with water. A disadvantage of this method of removing the alkali metal catalyst from the polymer is that the extraction process is time consuming and it is difficult to remove all of the resulting acetate salt. In the case of organopolysiloxane gums, the washing is effected by dissolving the gum in a suitable solvent such as toluene, neutralizing the alkali metal catalyst, and extracting the neutralization products with water. Although a satisfactory gum or elastomer may be prepared by this method, it is apparent that it is undesirable to have to dissolve the product in a solvent and then remove the solvent after removal of the catalyst.

Another method for decatalyzing alkali-metal catalyst in organopolysiloxanes is the method described and claimed in Patent 2,789,109—Grubb, which comprises decatalyzing of alkali-metal catalysts by incorporating elemental iodine into the catalyzed organopolysiloxane with the subsequent removal of excess iodine by evaporation. Although the process of the Grubb patent can be utilized to prepare perfectly satisfactory organopolysiloxane gums, there are several inherent difficulties in the process. The first of these difficulties is the fact that it is necessary to remove the excess iodine from the neutralized silicone gum. The second difficulty is that iodine is extremely corrosive in nature and is thus difficult to handle.

A further method of decatalyzing alkali-metal catalysts in alkali-metal polymerized organopolysiloxanes is the method described in Patent 2,739,952—Linville. This method comprises treating an organopolysiloxane gum that has been polymerized with an alkali-metal catalyst with an organophosphorous compound capable of reacting with the alkali-metal ion or atom in the alkali-metal catalyst. For most applications, this method is completely suitable. However, it is sometimes found that when the organophosphorus compounds as taught in the Linville patent are employed as decatalyzers for alkali base in undevolatilized gums, steam causes undesirable side effects during the devolatilization of such gums. For example, under such circumstances alcohols and phosphorous-containing acids are formed. The alcohols are usually removed from the gum during the steam treatment, leaving the acids in the gum. This acid material, of course, is undesirable, since it renders the gum unstable to both moisture and elevated temperatures. Thus, on continued treatment of the gum with steam, the gum reverts to a lower molecular weight state, which adversely affects the properties of silicone rubber prepared from the gum.

It has now been discovered that certain non-corrosive bromoalkanes can be effectively employed as decatalyzing agents for alkali-metal catalyst in organopolysiloxane polymers which are automatically eliminated from the polymer during normal processing procedures. In addition, these bromoalkanes are hydrolytically stable and can be employed in any stage of the processing of the polymer prior to its cure, to improve the moisture stability of the cured polymer at elevated temperatures.

In accordance with the present invention there is provided a process for decatalyzing alkali-metal catalyst in an organopolysiloxane polymer convertible to the cured, solid, elastic state comprising (A), intimately dispersing a minor amount of a bromoalkane having the formula:

(1)

throughout said organopolysiloxane polymer prior to cure, and (B), heating the resulting product of (A) to a temperature in the range of 50° C. to 250° C., where R is a member selected from the class of hydrogen, monovalent aliphatic radicals having up to four carbon atoms and halogenated monovalent hydrocarbon radicals having up to four carbon atoms.

Included within the radicals represented by R of Formula 1 are hydrogen, and aliphatic radicals such as alkyl radicals, alkenyl radicals, and alkynyl radicals having up to four carbon atoms, and halogenated derivatives thereof such as methyl, ethyl, propyl, butyl, chlorobutyl, vinyl, propenyl, etc. R is preferably hydrogen.

Tribromoalkanes that are included within the scope of Formula 2 are 1,2,3-tribromopropane, 1,2,3-tribromobutane, 1,2,3-tribromo-2-methylpropane, 2,3,4-tribromopentane, etc.

The alkali-metal catalysts which are used in the preparation of the organopolysiloxanes which may be treated by the process of the present invention include all of the alkali metal hydroxides, i.e., lithium hydroxide, sodium hydroxide, potassium hydroxide, rubidium hydroxide and cesium hydroxide. The process of the present invention is applicable to organopolysiloxanes which are polymerized directly with alkali metal hydroxides and also to organopolysiloxanes which are polymerized by silanolate salts of alkali metal hydroxides such as are mentioned in the Hyde Patent 2,567,110.

Organopolysiloxane polymers convertible to the cured, solid, elastic state to which the process of the present invention is applicable are generally well known in the art, and their method of preparation by the polymerization of low molecular weight organopolysiloxanes to higher molecular weight organopolysiloxanes in the presence of alkali-metal catalysts is also known.

One class of organopolysiloxane polymers within the scope of the present invention is the silanol chain-stopped polymers having the formula:

(2) 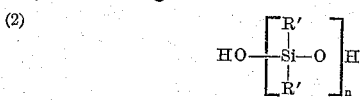

where $n$ is an integer equal to from 100 to 10,000, inclusive, and R′ is a member selected from the class of monovalent hydrocarbon radicals, halogenated monovalent hydrocarbon radicals and cyanoalkyl radicals. These polymers are in the form of linear fluids that can be prepared as described in Berridge Patent 2,843,555 by effecting reaction between one or more diorganosiloxanes (3) 

and 30 to 1000 parts of water per million of diorganosiloxane in the presence of an effective amount (.001 to .1 percent by weight, based on the weight of cyclic organopolysiloxane) of alkali-metal catalyst, where $n$ and R′ are as defined above.

Included with the radicals represented by R′ of Formulae 2 and 3 above are aryl radicals and halogenated aryl such as phenyl, chlorophenyl, tolyl, naphthyl, etc.; alkaryl radicals such as phenylethyl, benzyl, etc.; aliphatic, chloroaliphatic, and cycloaliphatic radicals including alkyl, alkenyl, cycloalkyl such as methyl, ethyl, propyl, chloropropyl, vinyl, cyclohexyl, etc.; cyanoalkyl radicals such as cyanoethyl, cyanopropyl, cyanobutyl, etc. R′ can be all the same radical or can be a mixture of two or more of the aforementioned radicals. R′ is preferably methyl, and as a mixture, R′ is preferably methyl and phenyl, where there is at least 75 mole percent methyl based on the total number of methyl and phenyl radicals.

In addition to the above described silanol chain-stopped organopolysiloxanes, the process of the present invention is also applicable to organopolysiloxanes having the formula:

(4) 

where R′ is as defined above, and $a$ is equal to from 1.95 to 2.01, inclusive. The organopolysiloxanes of Formula 4 can be highly viscous masses or gummy solids, depending upon the state of condensation, which have been prepared by the alkali-metal catalyst polymerization of low molecular weight cyclic organopolysiloxanes. These materials are convertible to the cured, solid, elastic state by means of heat, catalysts, or heat and catalysts.

Although the convertible organopolysiloxanes of Formula 4 with which the present invention is also concerned are well known, for purposes of showing persons skilled in the art the various convertible organopolysiloxanes which can be employed in the practice of the present invention, attention is directed to the convertible organopolysiloxanes disclosed and claimed in Agens Patent 2,448,756, Sprung et al. Patent 2,448,556, Sprung Patent 2,484,595, Krieble et al. Patent 2,457,688, Marsden Patent 2,521,528, Warrick Patent 2,541,137, and Hyde Patent 2,490,357. It should be understood that the process of the present invention is not limited to the use of organopolysiloxanes convertible to the solid, cured, elastic state, which are disclosed in the aforementioned patents. In addition to the particular convertible organopolysiloxanes of these patents, it should be understood that other convertible organopolysiloxanes containing the same or different silicon-bonded organic substituents may be employed.

The particular convertible organopolysiloxane can be any of those described and well known heretofore which are obtained by condensing or polymerizing in the presence of an alkali-metal catalyst an organopolysiloxane or mixture of organopolysiloxanes containing an average of from about 1.9 to 2.01, and preferably from about 1.98 to 2.01, organic groups per silicon atom. These convertible organopolysiloxanes generally comprise polymeric diorganopolysiloxanes which may contain, if desired, up to 2 mole percent of copolymerized monoorganosiloxanes, for example, polymerized monomethylsiloxane.

The starting organopolysiloxanes used to make the convertible organopolysiloxanes which ultimately can be converted to the cured, solid, elastic state preferably comprise diorganosiloxanes within the scope of Formula 3, wherein one or more different types of diorganosiloxanes are copolymerized to form the convertible organopolysiloxane. In particular, the organopolysiloxane units employed in preparing the convertible organopolysiloxane can be dimethylsiloxane units alone or copolymers of dimethylsiloxane and diphenylsiloxane, copolymers of dimethylsiloxane units, diphenylsiloxane units, and methylphenylsiloxane units, or copolymers of dimethylsiloxane units, diphenylsiloxane units, and methyl-β-cyanoethylsiloxane units.

Although a number of different types of organopolysiloxanes have been specifically described for use in the present invention, it should be understood that no criticality exists with regard to the type of organopolysiloxane. Thus, any of those organopolysiloxanes specifically described above may be employed or any other type of organopolysiloxane, so long as the organopolysiloxane in its high molecular weight state has been prepared from a lower molecular weight organopolysiloxane by polymerization in the presence of an alkali-metal catalyst. The amount of alkali-metal catalyst employed in the polymerization of the convertible organopolysiloxane is not critical and corresponds generally to the range utilized in the production of the silanol chain-stopped organopolysiloxanes taught above. The use of the alkali-metal catalyst in this range produces satisfactory polymerization and no particular benefit is derived from using less than 0.001 percent by weight, or more than about 1 percent by weight, of the alkali-metal catalyst. The particular physical conditions under which the alkali-metal catalyst polymerization takes place are also not critical. Thus, the reaction generally is effected at a temperature of from about 80 to 175° C., since satisfactory reaction rates are found in this temperature range. The use of reaction temperatures below about 80° C. offers a disadvantage in that the reaction rate is relatively slow. No particular advantage is observed from carrying out the polymerization at a temperature much above 175° C. Generally, the polymerization reaction is carried out at atmospheric pressure, but the use of sub-atmospheric or super-atmospheric pressure is not precluded.

In the practice of the invention, the bromoalkane is merely dispersed in effective amounts throughout polymerized organopolysiloxanes as shown in Formulae 2 and 4 to decatalyze the alkali metal catalyst contained therein. It is preferred to add the bromoalkane to the organopolysiloxane prior to devolatilization so as to avoid excess loss of polymer due to base catalyzed depolymerization favoring the formation of low boiling cyclics. If desired, the bromoalkane can also be added to the polymer after it has been devolatilized in order to impart improved reversion resistance to the resulting cured elastomer derived therefrom.

In order to achieve effective results, experience has demonstrated that at least enough bromoalkane in terms of atoms of bromine be utilized with the organopolysiloxane polymer, to provide at least 6 atoms of bromine per atom of alkali-metal based on the equivalent weight of alkali-metal catalyst employed in the polymerization. A preferred range is 10 atoms to 50 atoms of bromine per atom of alkali-metal.

In adding the bromoalkane to the organopolysiloxane, experience has shown that the bromoalkane should be thoroughly dispersed throughout the polymerized organopolysiloxane mass to enable the bromoalkane to effectively decatalyze the polymer. It is desirable therefore to thoroughly agitate the polymer with means known to the art, such as by stirring. If the polymer is particularly viscous, devices such as a doughmixer can be employed.

Although the temperature at which the decatalyzing of the alkali-metal base in the polymer takes place is not critical it is desirable to maintain the temperature of the polymer below the vaporization point of the particular bromoalkane employed while it is being added. Excess amounts of bromoalkane are readily eliminated from the polymer at temperatures employed between the initial devolatilization stage to the curing of the resulting polymer. Temperatures in the range of 50° C. to 250° C. or higher can be employed during the processing stages to achieve the decatalyzing results desired.

In order that those skilled in the art may better understand how the present invention can be practiced, the following examples are given by way of illustration and not by way of limitation. All parts are by weight.

EXAMPLE 1

One hundred parts of octamethylcyclotetrasiloxane was charged to a reaction vessel and the vessel was heated. At a temperature of 110° C., dry nitrogen was passed through the system to remove moisture and oxygen. When the temperature reached approximately 150° C., 10 parts of potassium hydroxide per million of octamethylcyclotetrasiloxane were added. During the course of the polymerization, 1000 parts of water per million of octamethylcyclotetrasiloxane were added slowly. The mixture was agitated and heated at 160° C. for four hours to complete the equilibration. Approximately 0.1 part of 1,2,3-tribromopropane was then added. The mixture was heated and stirred for an additional half hour. The resulting silanol chain-stopped polymer was devolatilized at 15 mm. Hg at 150° C. to 160° C. The final product had a viscosity of 3000 cps. at 25° C.

The above procedure was repeated except that no 1,2,3-tribromopropane was added to the mixture prior to devolatilizing to decatalyze the organopolysiloxane polymer.

The table below shows the results of a test to determine the heat stability of the organopolysiloxane polymer made in accordance with the practice of the present invention, referred to as "bromoalkane" as compared to the control which was not treated with 1,2,3-tribromopropane. The test employed to measure the stability of the respective polymers, involved the determination of percent weight loss of polymer after separately heating two parts of each polymer on a hot plate with a surface temperature of 375° C. for 15 minutes at a pressure of 5 mm. Hg.

*Table*

| Polymer: | Wt. loss, percent |
|---|---|
| Bromoalkane | 3.3 |
| Control | >50 |

EXAMPLE 2

A methyl silicone gum is prepared by heating a mixture of methylpolysiloxanes containing an average of about 2.001 methyl radicals per silicon atom with 0.01 percent by weight potassium hydroxide at 150° C. for about six hours. This gum has a viscosity of about 500,000 centipoises at room temperature. One part of 1,2,3-tribromopropane is added to 100 parts of the gum with stirring.

Equal parts of the above gum containing 1,2,3-tribromopropane, and gum free of the bromoalkane are heated in vessels at 250° C. over an extended period of time to devolatilize the gums. It is observed that the gum free of 1,2,3-tribromopane suffers considerable more weight loss than the gum containing 1,2,3-tribromopropane.

In addition to providing a process for decatalyzing alkali-metal catalyst in organopolysiloxanes, the present invention also provides the art with organopolysiloxanes that have improved resistance to moisture at elevated temperatures.

While the foregoing examples have of necessity been limited to only a few of the very many variables within the scope of the present invention, it should be understood that the present invention covers a much broader class of organopolysiloxane compositions containing the bromoalkanes included within the scope of the present invention. All of these various materials are prepared by methods specifically illustrated in the example above and described further in the foregoing description of the foregoing invention.

What I claim as new and desire to secure by Letters Patent of the United States is:

1. A process for decatalyzing alkali-metal catalyst present in an organopolysiloxane convertible to the cured, solid, elastic state comprising (A), intimately dispersing a bromoalkane having the formula:

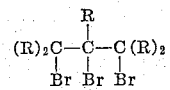

throughout said organopolysiloxane where said bromoalkane is utilized in said organopolysiloxane in an amount sufficient to provide for at least 6 atoms of bromine per atom of alkali metal of said alkali metal catalyst, and (B), heating the resulting product of (A) to a temperature in the range of 50° C. to 250° C., where R is a member selected from the class of hydrogen, monovalent hydrocarbon aliphatic radicals having up to four carbon atoms and halogenated monovalent hydrocarbon aliphatic radicals having up to four carbon atoms, said organopolysiloxane having a ratio of from 1.95 to 2.01 organo radicals per silicon atom attached to silicon by carbon-silicon linkages selected from the class consisting of monovalent hydrocarbon radicals, halogenated monovalent hydrocarbon radicals, and cyanoalkyl radicals.

2. A process for decatalyzing alkali-metal catalyst present in an organopolysiloxane having the formula:

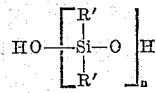

comprising (A), intimately dispersing a bromoalkane having the formula:

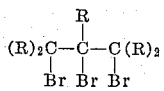

throughout said organopolysiloxane in an amount sufficient to provide in said organopolysiloxane, at least 6 atoms of bromine per atom of alkali metal of said alkali-metal catalyst, and (B), heating the resulting product of (A) to a temperature in the range of 50 C. to 250° C., where R is a member selected from the class consisting of hydrogen, monovalent hydrocarbon aliphatic radicals having up to four carbon atoms and halogenated monovalent hydrocarbon aliphatic radicals having up to four carbon atoms, $n$ is an integer equal to from 100 to 10,000, inclusive, and R′ is a member selected from the class consisting of monovalent hydrocarbon radicals, halogenated monovalent hydrocarbon radicals and cyanoalkyl radicals.

3. A process for decatalyzing alkali-metal catalyst present in an organopolysiloxane convertible to the cured, solid, elastic state having the formula:

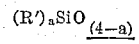

comprising (A), intimately dispersing a bromoalkane having the formula:

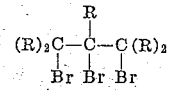

throughout said organopolysiloxane in an amount sufficient to provide in said organopolysiloxane, for at least 6 atoms of bromine per atom of alkali metal of said alkali-metal catalyst and (B) heating the resulting product of (A) to a temperature in the range of 50° C. to 250° C., where R is a member selected from the class consisting of hydrogen, monovalent hydrocarbon aliphatic radicals having up to four carbon atoms and halogenated monovalent hydrocarbon aliphatic radicals having up to four carbon atoms, R′ is a member selected from the class consisting of monovalent hydrocarbon radicals, halogenated monovalent hydrocarbon radicals and cyanoalkyl radicals, and $a$ is equal to from 1.95 to 2.01, inclusive.

4. A process in accordance with claim 1, where the bromoalkane is 1,2,3-tribromopropane.

References Cited in the file of this patent

UNITED STATES PATENTS 2,789,109     Grubb  ---------------- Apr. 16, 1957
2,914,502     Bueche  --------------- Nov. 24, 1959